United States Patent
Onodera et al.

(10) Patent No.: US 7,215,352 B2
(45) Date of Patent: May 8, 2007

(54) INFORMATION RECORDING SYSTEM AND INFORMATION RECORDING METHOD

(75) Inventors: Keiichi Onodera, Tokyo (JP); Hiroyuki Kurashina, Tokorozawa (JP); Takeshi Takahashi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/101,560

(22) Filed: Apr. 8, 2005

(65) Prior Publication Data

US 2005/0179766 A1 Aug. 18, 2005

Related U.S. Application Data

(63) Continuation of application No. 09/817,895, filed on Mar. 28, 2001.

(30) Foreign Application Priority Data

Mar. 31, 2000 (JP) ............... 2000-98926

(51) Int. Cl.
 *B41J 2/47* (2006.01)
 *G11B 7/26* (2006.01)

(52) U.S. Cl. ..................... 347/225; 369/284

(58) Field of Classification Search ............ 369/30.23, 369/275.1–275.4, 284, 59.11, 30.05, 44.23, 369/47.5–47.52, 53.23, 53.28, 53.34; 347/224–225; 250/201.5; 359/618; 264/401
See application file for complete search history.

(56) References Cited

U.S. PATENT DOCUMENTS

| | | | |
|---|---|---|---|
| 4,711,996 A | 12/1987 | Drexler | 235/468 |
| 4,967,286 A | 10/1990 | Nomula et al. | 386/124 |
| 5,138,604 A | 8/1992 | Umeda et al. | 369/103 |
| 5,281,797 A * | 1/1994 | Tatsuno et al. | 250/201.5 |
| 5,509,991 A | 4/1996 | Choi | 156/245 |
| 5,608,718 A | 3/1997 | Schiewe | |
| 5,675,570 A | 10/1997 | Ohira et al. | 369/275.1 |
| 5,729,533 A | 3/1998 | Marquardt | 369/273 |
| 5,737,306 A | 4/1998 | Ito et al. | 369/275.1 |
| 5,748,607 A | 5/1998 | Ohira et al. | 369/275.4 |
| 5,751,671 A | 5/1998 | Koike et al. | 369/14 |
| 5,751,690 A | 5/1998 | Ohira et al. | |
| 5,809,003 A | 9/1998 | Taira et al. | 369/275.1 |
| 5,875,156 A | 2/1999 | Ito et al. | 369/30.1 |
| 5,967,676 A | 10/1999 | Cutler et al. | 400/70 |
| 6,031,667 A * | 2/2000 | Sugiura et al. | 359/618 |
| 6,088,323 A | 7/2000 | Kobayashi et al. | 369/275.3 |
| 6,226,109 B1 | 5/2001 | Tompkin et al. | 359/2 |
| 6,259,666 B1 * | 7/2001 | Kobayashi et al. | 369/59.11 |

(Continued)

FOREIGN PATENT DOCUMENTS

EP 0 762 407 3/1997

(Continued)

*Primary Examiner*—Hai Pham
(74) *Attorney, Agent, or Firm*—Drinker Biddle & Reath LLP

(57) ABSTRACT

System and method are devised to produce an optical recording medium suitable for identification and management. A recording layer formed in the optical recording medium is irradiated with writing light by a pickup. A visible image pattern suitable for identification, management or the like is formed on the optical recording medium by generating changes in optical characteristics of a portion irradiated with light and a portion not irradiated with light in the recording layer.

20 Claims, 11 Drawing Sheets

U.S. PATENT DOCUMENTS

| | | | |
|---|---|---|---|
| 6,392,964 B2 | 5/2002 | Koyata et al. | 369/30.04 |
| 6,406,658 B1 * | 6/2002 | Manners et al. | 264/401 |
| 6,490,239 B1 | 12/2002 | Nagasaka | |
| 6,507,557 B1 | 1/2003 | Ohno et al. | 369/275.3 |
| 6,556,234 B1 | 4/2003 | Koyama | 347/264 |
| 6,754,158 B1 | 6/2004 | Kobayashi et al. | 369/59.11 |
| 2003/0107959 A1 * | 6/2003 | Norton et al. | 369/30.23 |

FOREIGN PATENT DOCUMENTS

| | | |
|---|---|---|
| EP | 0840 307 | 5/1998 |
| EP | 0 895 242 | 2/1999 |
| JP | 59-190895 | 10/1984 |
| JP | 59-215892 | 12/1984 |
| JP | 61-243967 | 10/1986 |
| JP | 05-325265 | 12/1993 |
| JP | 08-180463 | 7/1996 |
| JP | 8-287525 | 11/1996 |
| JP | 09-073666 | 3/1997 |
| JP | 09-106575 | 4/1997 |
| JP | 09-277512 | 10/1997 |
| JP | 09-326185 | 12/1997 |
| JP | 10-329460 | 12/1998 |
| JP | 11-126459 | 5/1999 |
| JP | 11-213390 | 8/1999 |
| JP | 11-213455 | 8/1999 |
| JP | 11283356 A * | 10/1999 |

* cited by examiner

INFORMATION RECORDING SYSTEM AND INFORMATION RECORDING METHOD

This is a continuation application of prior application Ser. No. 09/817,895, filed on Mar. 28, 2001, which is incorporated by reference herein in its entirety.

BACKGROUND OF THE INVENTION

1. Field of the Invention

The present invention relates to an information recording system provided with a function of recording visible information on an optical recording medium.

2. Description of the Prior Art

CDs (Compact Disk), DVDs (Digital Video Disk or Digital Versatile Disk) and so forth are known as optical recording media for optically recording or reproducing information. A write-once type disk and rewritable disk in which information can be recorded have also been developed, providing excellent convenience for users.

For example, a user can enjoy writing and editing contents data such as music, image or the like and creating his/her own disk having originality by utilizing these write-once type or rewritable disks. In addition, a user can create discs which offer greater convenience by writing computer program data needed for combining all their essential applications onto a single disc.

However, as the number of disks in use increases, a problem arises that it is difficult to pick up a desired disk from many disks or manage these disks due to the difficulty in identifying disks from their appearance.

Therefore, as shown in FIG. 1, a user can write characters or illustrations by using a writing tool on a side of a conventional disk which is not used for writing information, that is, the back side (hereinafter, referred to as label side) of a side irradiated with light beam for writing and reading information.

However, while the disk on which a user can write information as described above can provide excellent convenience to the user, technical backwardness remains that the easiest way to manage disks is to hand-write characters or illustrations for identification on a label side with a writing tool. When hand-written on a label side, the characters or illustrations may gradually fade away and become unclear or deteriorate appearance. Thus, development of a novel technique which substitutes for handwriting and can identify a disk at one glance as in the case of hand-written has been required.

SUMMARY OF THE INVENTION

The present invention has been accomplished to solve these conventional problems. Accordingly, an object of the present invention is to provide an information recording system having a function of recording visible information.

To achieve the above object, an aspect of the present invention is an information recording system and an information recording method for recording information on an optical information recording medium, wherein a recording layer formed on the optical recording medium is irradiated with light to generate changes in optical characteristics between a portion irradiated with light and an unirradiated portion in the recording layer so that a visible image pattern is formed. Another aspect of the present invention is characterized in that the visible image pattern is formed based on a difference in reflectance between an area where pits are formed by irradiating the recording layer formed on the optical recording medium with light and an area which is not irradiated with light not to form pits.

According to these information recording system and information recording method, a recording layer which is formed in an optical recording medium is irradiated with light by writing means. This irradiated light causes changes in optical characteristics of the recording layer. A visible image pattern can be formed by forming a portion where the optical characteristics change. That is, the visible image pattern is formed based on the difference in reflectance between an area where pits are formed by irradiating the recording layer with light and an area which is not irradiated light not to form pits. An image pattern having an identification property similar to conventional hand-written characters, symbols, illustrations or the like can be formed by forming this visible image pattern into an appropriate shape. Thus, management, identification and the like of a plurality of optical recording media become possible.

DETAILED DESCRIPTION OF THE PREFERRED EMBODIMENTS

An embodiment of the present invention will be described below with reference to the accompanying drawings. A digital audio system capable of using a write-once type disk such as CD-R or the like, a rewritable disk such as CD-RW or the like and a disk exclusively for reproduction such as CD-ROM, CD-DA or the like is described as a preferred embodiment.

First, terms "pit art", "pit art data" and "pit art recording" used in description of this embodiment are defined.

"Pit art" is an image pattern which is made visible by recording data in a recording layer of a disk such as a CD-R or the like in which data can be written and utilizing the difference in reflectance or the like between a portion where data is recorded and a portion where data is not recorded. That is, unlike ordinary data recording, "pit art" is an image pattern such as characters, illustrations or the like recorded in a recording layer so as to be visible.

"Pit art data" is data written to form a "pit art" in a recording layer of a disk.

"Pit art recording" is to record "pit art data" in a recording layer of a disk, in which data can be written.

Figure 1:
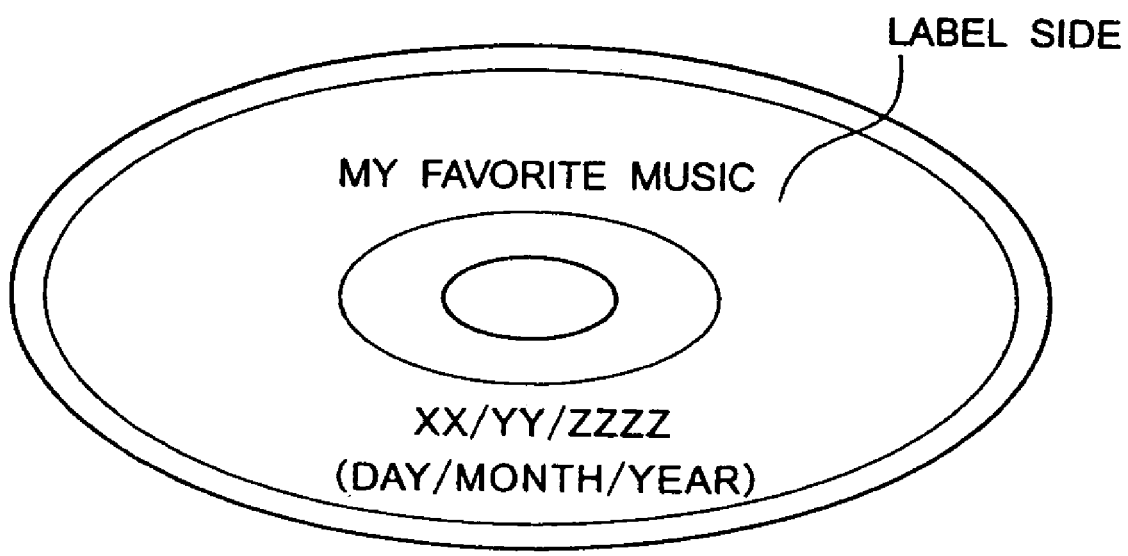
FIG. 1 shows a disk on a label side of which characters or the like are handwritten.
Figure 2:
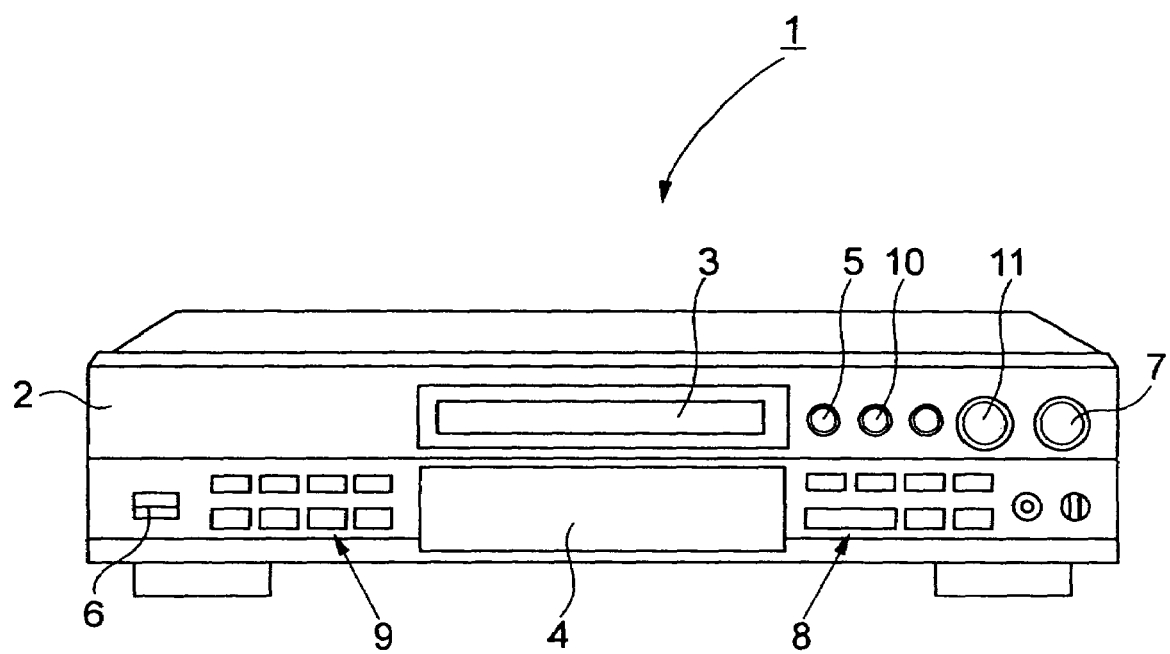
FIG. 2 shows an appearance of a digital audio system according to one embodiment of the invention.
Figure 3:
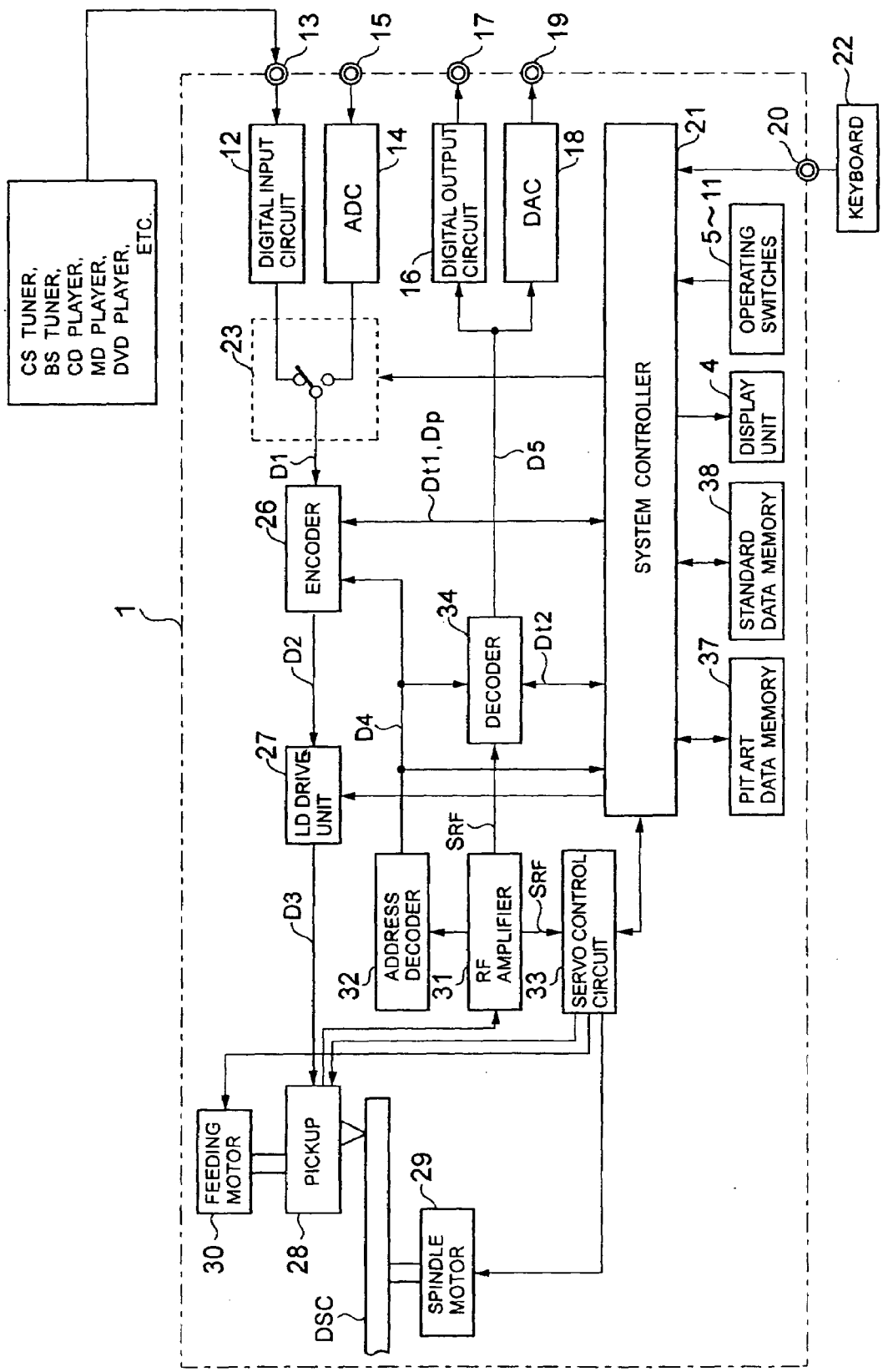
FIG. 3 is a block diagram showing an internal configuration of the digital audio system of this embodiment.
Figure 4:
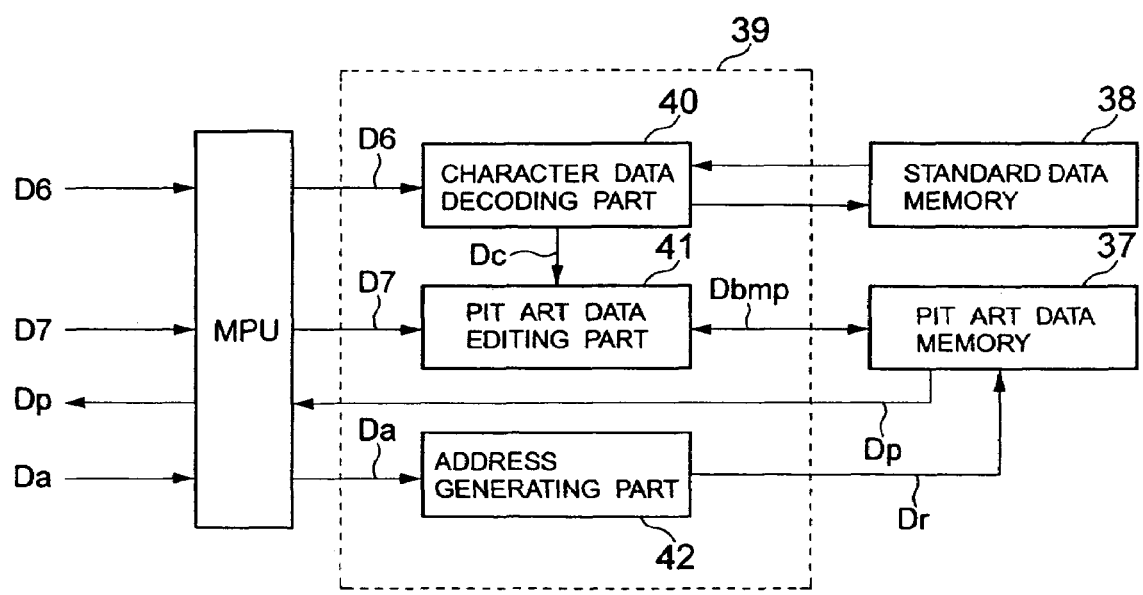
FIG. 4 is a block diagram showing a configuration of a pit art data generating partXX provided in the digital audio system of this embodiment.

FIG. 2 shows an appearance of this digital audio system. FIGS. 3 and 4 are block diagrams showing an internal configuration of this digital audio system.

In FIG. 2, a front panel 2 of this digital audio system 1 is provided with a disk inserting port 3 for loading and unloading a disk, which is an optical recording medium, and a display unit 4 formed with a liquid crystal display or the like. A plurality of operating switches are provided surrounding the disk inserting port 3 and the display unit 4.

As representative operating switches, an eject switch 5 for allowing the loading and unloading, a power-on switch 6, a rotary switch 7 for controlling the sound volume, a plurality of function switches 8 disposed to the right side of the display unit 4, a plurality of function switches 9 disposed to the left side of the display unit 4, a recording start switch 10 for instructing the start of recording and a rotary switch 11 called jog dial are provided.

A movable tray (not shown) for placing a disk thereon is provided in the disk inserting port 3. When the eject switch 5 is pressed, the movable tray is moved back and forth via the disk inserting port 3 so as to load or unload a disk to or from a so-called clamp position.

More specifically, when the eject switch 5 is pressed in a state that the movable tray is positioned deep inside the disk inserting port 3, the movable tray is projected forward via the disk inserting port 3. Consequently, a disk already loaded can be removed or a new disk can be loaded. When the eject switch 5 is pressed in a state that the movable tray is projected forward via the disk inserting port 3, the movable tray is automatically moved deep into the disk inserting port 3 and loading is carried out.

In this digital audio system 1, a disk is placed with its label side facing the movable tray. Consequently, a user loads a disk onto or unloads from the movable tray while directing the label side of the disk downward (the movable tray side) with the side of the disk on which data is recorded or reproduced in view.

The plurality of function switches 8 are constituted by a plurality of operating switches for starting reproduction of data recorded in a disk, temporarily stopping data reproduction, specifying a track number with which data is recorded and so forth.

The plurality of function switches 9 are constituted by a plurality of operating switches operated when pit art data is written in a write-once type disk or a rewritable disk. More specifically, in addition to a pit art recording start switch for instructing the start of pit art recording, the function switches 9 are constituted by a plurality of editing switches for editing size, arrangement or the like of characters, illustrations or the like to be recorded as a pit art and a settlement switch for settling the edited characters, illustrations or the like.

The rotary switch 11 called as a jog dial is provided for selecting characters, symbols, illustrations or the like to be recorded as a pit art by a user. Each time the user rotates the rotary switch 11 at a prescribed angle, data of the characters, symbols, illustrations or the like is switched. When the settlement switch is operated, the characters, symbols, illustrations or the like selected by the rotary switch 11 are settled as a pit art.

While not shown in FIG. 2, external equipment connecting terminals for connecting external equipment such as a CS tuner, BS tuner, CD player, MD player, DVD player or the like and a keyboard connecting terminal for connecting a keyboard are provided on the rear surface of the digital audio system 1.

The internal configuration of this digital audio system 1 will be described below with reference to FIG. 3. A digital input terminal 13 connected to a digital input circuit 12, an analog input terminal 15 connected to an A/D converter 14, a digital output terminal 17 connected to a digital output circuit 16 and an analog output terminal 19 connected to a D/A converter 18 are provided as the external equipment connecting terminals.

The digital input terminal 13 is composed of an optical digital input terminal or coaxial digital input terminal. The digital input circuit 12 converts optical or electrical digital data supplied via the digital input terminal 13 to digital data which can be processed by signals and inputs the data.

Consequently, when external equipment such as a CS tuner, BS tuner, CD player, MD player or the like is connected to the digital input terminal 13, digital data supplied from this external equipment is inputted in this digital audio system 1 as digital data.

The analog input terminal 15 is provided for inputting analog signals. That is, when external equipment such as a CD player, MD player or the like is connected to the analog input terminal 15 and audio signals reproduced as analog data are supplied from this external equipment, the audio signals are converted to digital data by the A/D converter 14 and inputted into the digital audio system 1.

The digital output terminal 17 is composed of an optical digital output terminal or coaxial digital output terminal. When the digital audio system 1 reproduces data in a write-once type disk, rewritable disk or disk exclusively used for reproduction, the digital output circuit 16 converts the reproduced digital data obtained by this reproduction to optical or electrical digital data and outputs the data to external equipment via the digital output terminal 17.

The D/A converter 18 converts digital data reproduced from a write-once type disk, rewritable disk or disk exclusively used for reproduction to analog signals and outputs the signals to the outside via the analog output terminal 19. Consequently, when an analog amplifier connected to a speaker is connected to the analog output terminal 19, reproduced sound can be played by the speaker. When analog equipment such as an analog tape recorder or the like is connected, reproduced sound can be recorded in the analog form.

The keyboard connecting terminal 20 is connected to a system controller 21 provided with a microprocessor (MPU). When a user connects a keyboard 22 conforming to the JIS or the like to the keyboard connecting terminal 20, instruction for pit art data editing and pit art recording can be carried out by keyboard operation instead of operating the function switches 9 and the rotary switch 11.

An encoder 26 and an LD drive circuit are subordinately connected to the digital input circuit 12 and A/D converter 14 via a two-contacts switching circuit 23 controlled by the system controller 21.

The encoder 26 is controlled by the system controller 21 and performs EFM (Eight-Fourteen Modulation) and CIRC (Cross Interleave Reed-Solomon Code) interleaving on data D1 inputted from the two-contacts switching circuit 23. The data D2 for writing generated during this processing is outputted to the LD drive circuit 27. Although details will be described later, when pit art data Dp is supplied from the system controller 21, the data D2 for writing is generated based on the pit art data Dp and outputted to the LD drive circuit 27.

The LD drive circuit 27 is controlled by the system controller 21 and performs power amplification of data D2 for writing from the encoder 26 and supplies the data to a semiconductor laser (not shown) in a pickup 28. Consequently, a recording layer of a disk DSC is irradiated with light modulated by the power amplified data D3 for writing (hereinafter, referred to as writing light) to perform data writing.

When data is read from the disk DSC, the LD drive circuit 27 irradiates the recording layer of the disk DSC with light having a certain power (hereinafter, referred to as reading light) by supplying a certain power instructed by the system controller 21 to the semiconductor laser in the pickup 28.

A spindle motor 29 for rotating a clamped disk DSC at a certain linear velocity and a feeding motor 30 for moving the pickup 28 back and forth in the radius direction of the disk DSC are provided at the aforementioned clamp position.

Furthermore, an optical detector (not shown) in the pickup 28 performs photoelectric conversion of returning light generated in response to the writing light or reading light irradiated on the disk DSC when data is written or read. An RF amplifier 31 supplies the photoelectrically converted signals SRF to an address decoder 32, servo control circuit 33 and decoder 34.

The address decoder 32 detects a track address on the disk DSC irradiated with the writing light or reading light from the photoelectrically converted signals SRF outputted from the RF amplifier 31 and supplies the detected address data D4 to the encoder 26 and the system controller 21.

Consequently, the encoder 26 transfers the data D2 for writing in synchronism with the address data D4 to the LD drive circuit 27 when the data is recorded as described above. The system controller 21 judges whether the pickup 28 is in an on-track state at the track address on the disk DSC where data is to be written when the data is recorded.

The decoder 34 receives input of the photoelectrically converted signals SRF outputted from the RF amplifier 31 and the address data D4 outputted from the address decoder 32, and EFM demodulates and deinterleaves audio data or the like included in the photoelectrically converted signals SRF in synchronism with the address data D4. Consequently, decoding processing opposite to processing by the encoder 26 is performed and decoded data D4 generated by this processing is supplied to the digital output circuit 16 and the D/A converter 18.

When TOC (table of contents) data is read from a disk DSC by data reproduction, the decoder 34 decodes this TOC data and supplies the decoded TOC data Dt2 to the system controller 21.

The servo control circuit 33 detects tracking error or focusing error based on the photoelectrically converted signals SRF outputted from the RF amplifier 31 and servo-controls the spindle motor 29, feeding motor 30 and pickup 28 based on the detection result.

Furthermore, a pit art data memory 37 and a standard data memory 38 are connected to the system controller 21 and a pit art data generating partXX 39 shown in FIG. 4 is provided.

The pit art data generating partXX 39 is constituted by a character data decoding partXX 40, pit art data editing partXX 41 and address generating partXX 42 and generates pit art data Dp under the control of the microprocessor MPU provided in the system controller 21.

The character data decoding partXX 40 receives input of the character information data from the rotary switch 11 called jog dial and character information data from the keyboard 22 via the microprocessor MPU, retrieves standard character data Dc stored in the standard data memory 38 in advance based on the character information data D6 and supplies the data to the pit art data editing partXX 41.

Although details will be described later, when data in an information recording medium such as a CD, MD or the like in which data is already recorded is reproduced and a pit art is recorded based on the reproduced data, the character data decoding partXX 40 receives input of the character information data such as TOC, UTOC (user table of contents) or the like included in the reproduced data and supplies the data to the pit art data editing partXX 41.

When a pit art is recorded based on data supplied from external equipment such as a CS tuner, BS tuner or the like, the character data decoding partXX 40 receives input of the character information data Dp included in the data and supplies the data to the pit art data editing partXX 41.

The pit art data editing partXX 41 converts standard character data Dc to data Dbmp in a bit map format (hereinafter, referred to as bit map data) and stores the data in the pit art data memory 37. When the user edits data by operating the function switches 9 or the keyboard 22, the pit art data editing partXX 41 receives input of the editing instruction data D7 via the microprocessor MPU, edits the bit map data Dbmp according to the editing instruction and stores the data in the pit art data memory 37.

The address generating partXX 42 generates address data Dr for reading bit map data Dbmp stored in the pit art data memory 37. That is, this partXX judges the position of the pickup 28 in relation to the disk DSC based on the address data D4 supplied from the address decoder 32 via the microprocessor MPU. Then, when the partXX determines that the pickup 28 comes to the position at which a pit art is to be recorded, the partXX accesses the pit art data memory 37 by the address data Dr and supplies the bit map data Dbmp as pit art data Dp for each dot to the encoder 26 via the microprocessor MPU and allows the pickup 28 to record the pit art.

Operation of this digital audio system 1 having the above constitution will be described below.

This digital audio system 1 is provided with three kinds of modes for recording a pit art under the control of the system controller 21.

When a user selects a first mode (hereinafter, external data recording mode) by a function switch 9 and audio data supplied from external equipment such as a CS tuner, BS tuner, CD player, MD player, DVD player or the like connected to the digital input terminal 13 is recorded (copied) in a write-once type disk or a rewritable disk, character information data supplied from a CS tuner or BS tuner, character information data included in TOC data supplied from a CD player or character information data included in UTOC data supplied from an MD player are automatically edited. Then, pit art data Dp generated by automatic editing is written in the write-once type disk or rewritable disk. Thus, a pit art is recorded automatically.

When the user selects a second mode (hereinafter, referred to as internal data recording mode) by a function switch 9, the TOC data already stored in a write-once type disk or rewritable disk loaded in the digital audio system 1 is reproduced. Character information data included in the reproduced TOC data is automatically edited and the pit art data Dp generated by automatic editing is written in the loaded write-once type disk or rewritable disk. Thus, a pit art is recorded automatically.

When the user selects a third mode (hereinafter, referred to as manual mode) by a function switch 9, the user can edit pit art data Dp by operating the rotary switch 11 or the keyboard 22.

Operation in the external data recording mode will be described first with reference to flowcharts in FIGS. 5 and 6. In operation described here as a typical case, the user loads a CD-R as a disk DSC in this digital audio system 1, connects a CD player as external equipment to the digital input terminal 13 and records (copies) reproduced data of a CD-DA reproduced by the CD player on the CD-R as a disk DSC.

Figure 5:
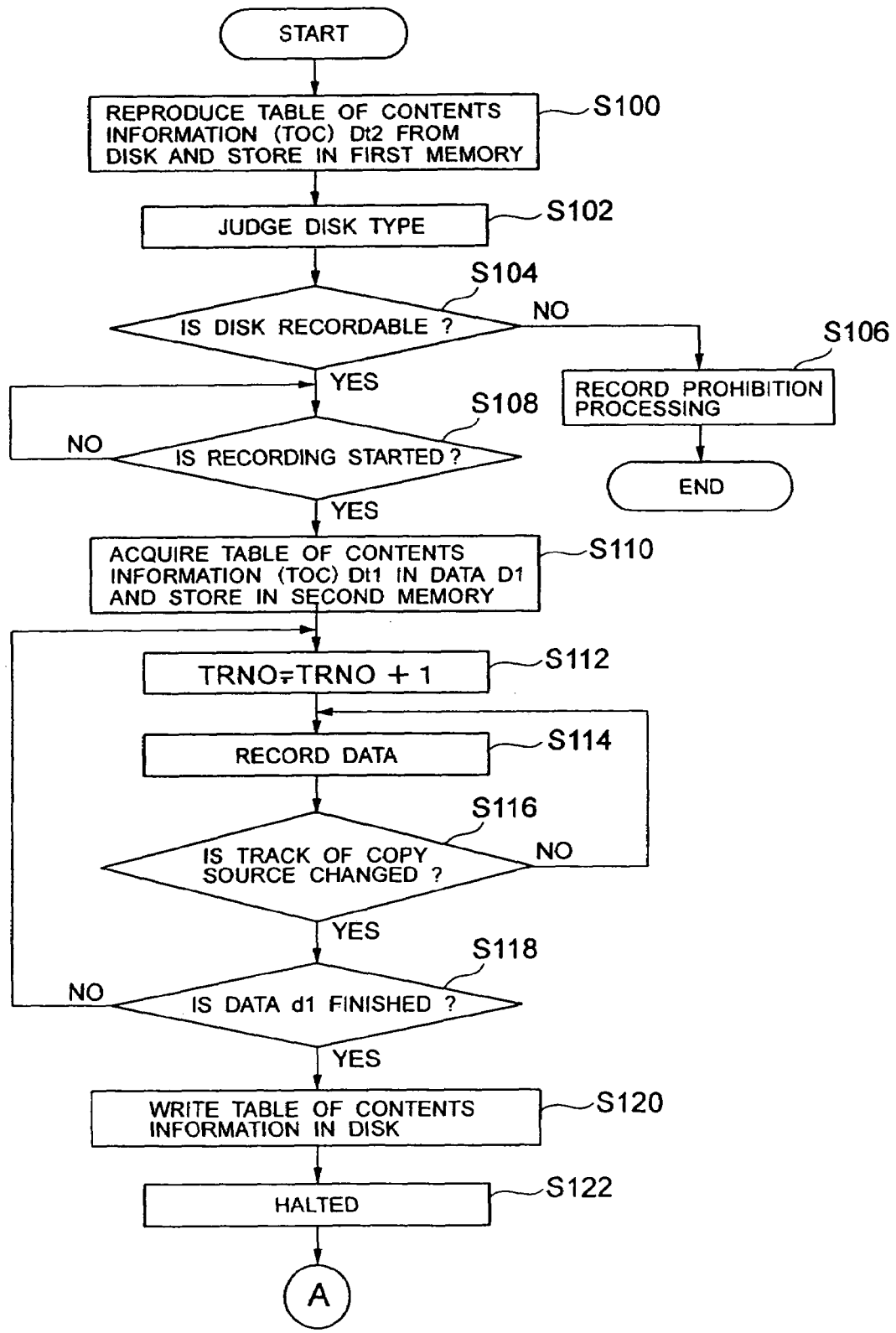
FIG. 5 is a flowchart for explaining operation in a first automatic mode in the digital audio system of the embodiment.

In FIG. 5, when the user loads a disk DSC, the TOC data Dt2, which is table of contents information, is reproduced from the disk DSC and stored in a first memory (not shown) in the system controller 21 (step S100).

Subsequently, the type of the loaded disk is judged based on the TOC data Dt2 (step S102).

Subsequently, whether a recordable disk is loaded is judged (step S104). Here, if a disk exclusively used for reproduction such as a CD-ROM or the like is loaded, record prohibition processing such as displaying a message in the display unit 4 to the effect that data cannot be recorded is performed (step S106). Then, the processing is forcibly terminated.

On the other hand, when the disk DSC is a CD-R, it is determined that a recordable disk is loaded and the processing proceeds to step S108.

In step S108, whether a recording start switch 10 is turned on is judged and the processing remains in a standby state until the switch is turned on. In this standby state, the user starts reproduction by the CD player, which is external equipment. When the user further turns on the recording start switch 10, data reproduced from the CD player is inputted as input data D1.

Subsequently, the encoder 26 acquires TOC data Dt1, which is table of contents information included in the input data D1. This data is stored in a second memory (not shown) in the system controller 21 (step S110).

Subsequently, the pickup 28 is moved to a recording start address on a disk DSC. If data is already recorded in the disk DSC, a new track number TRNO is obtained by adding 1 to the track number TRNO assigned to the data (step S112).

Subsequently, the encoder 26 encodes the input data D1 and starts recording the data by the pickup 28 by using the new track number TRNO as a first track number (step S114).

Subsequently, whether the track number assigned to the data D1 from the CD player, which is a copy source, is changed is judged (step S116). If the track number is not changed, data recording in step S114 is continued.

On the other hand, if it is determined in step S116 that the track number assigned to the data D1 is changed, the processing proceeds to step S118 and whether supply of the data D1 from the CD player is finished is judged. Here, if the supply of the data D1 is not finished, it is determined that data D1 of the next track number is supplied. In step S112, the next track number is set and recording of the data D1 is continued (step S114).

When all the data D1 from the CD player is recorded, the processing proceeds to step S120 and finalization processing is performed. The table of contents information about the data D1 recorded so far is written in a read-in area of the disk DSC together with TOC data Dt2. After data is further recorded in a read-out area, the processing is halted (step S122) and then proceeds to step S200 in FIG. 6.

Figure 6:
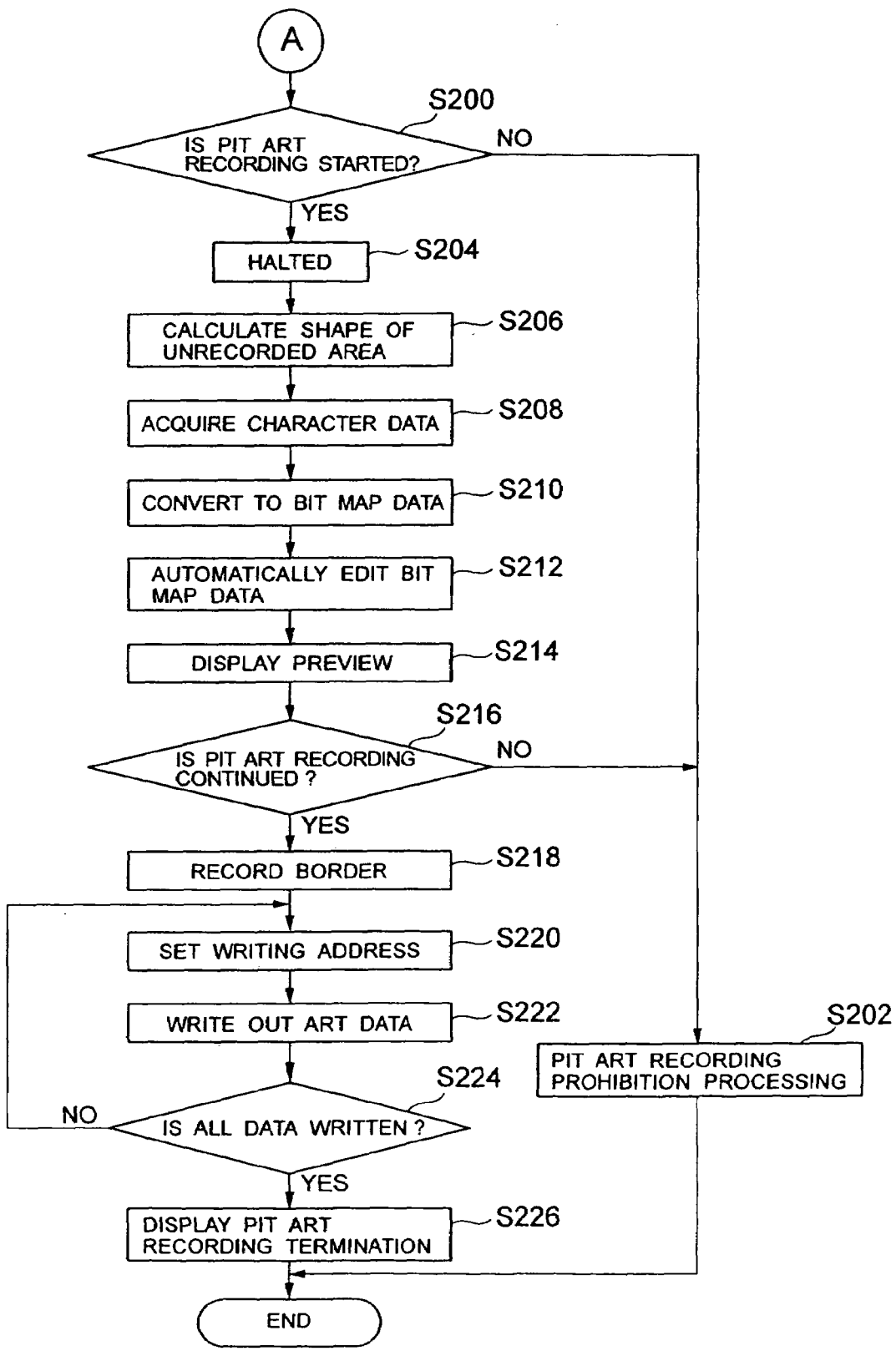
FIG. 6 is a flowchart for further explaining operation in the first automatic mode in the digital audio system of this embodiment.

In step S200 in FIG. 6, whether the user turns on a pit art recording start switch among the function switches 9 during the halt state is judged. Here, if the pit art recording start switch is not turned on within a prescribed time, the processing proceeds to step S202 and pit art recording prohibition processing is performed. Then a series of data recording processing is terminated without carrying out pit art recording.

On the other hand, when the pit art recording start switch is turned on, the processing is halted (step S204) and then proceeds to step S206.

In step S206, the first address ADRS of an unrecorded area remaining in the disk DSC is detected from the TOC data Dt2 acquired in step S100 and the table of contents information data written in step S120. Further, a terminal end address ADRE of the unrecorded area is detected based on the maximum read-out start position information (position information indicating the latest address among position information standardized as read-out recording start address) recorded as ATIP information in a wobbled portion of the read-in area. Then, these address data ADRS and ADRE are supplied to the pit art data editing partXX 41 shown in FIG. 3 with data D7 for editing instruction.

Figure 7:
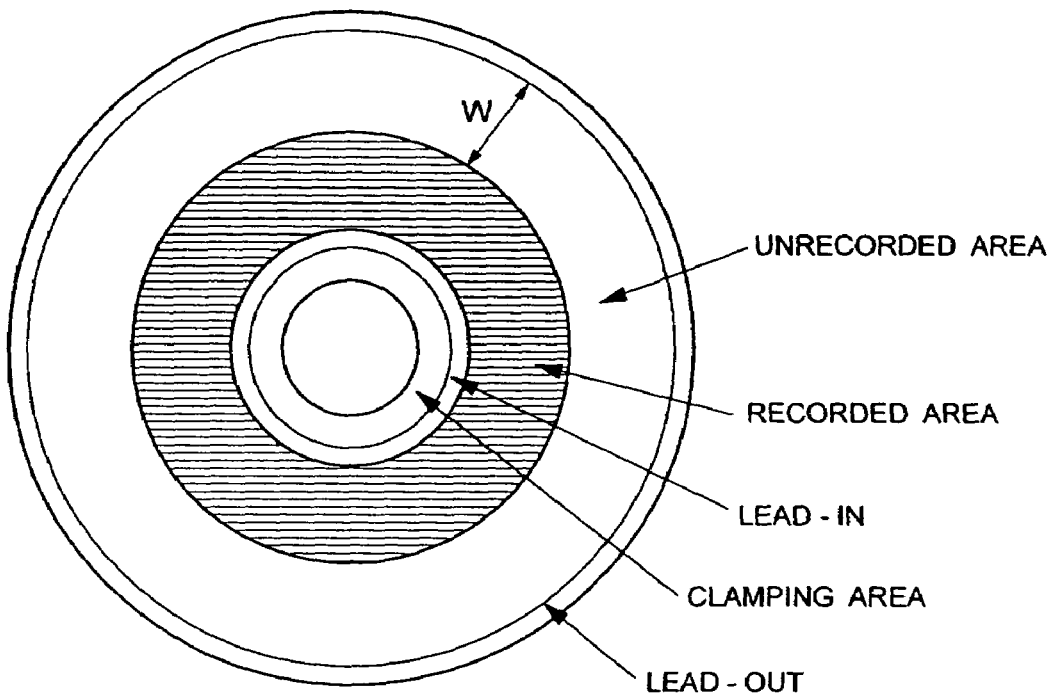
FIG. 7 is an explanatory view showing an unrecorded area in which a pit art is recorded.

Furthermore, the pit art data editing partXX 41 calculates the shape of the unrecorded area based on the address data ADRS and ADRE. That is, as shown in FIG. 7, the width W of the unrecorded area in the radius direction of the disk DSC is calculated and the shape of the unrecorded area in an annular shape matching the width W is obtained.

Subsequently, in step S208, character information data D6 (data such as album titles, names of music pieces, artist names and the like) conforming to the CD-TEXT standard included in the TOC data Dt1 stored in the second memory is supplied to the character data decoding partXX 40 shown in FIG. 4.

Subsequently, in step S210, the character data decoding partXX 40 retrieves standard character data Dc corresponding to the character information data D6 and supplies the data to the pit art data editing partXX 41. The pit art data editing partXX 41 converts the standard character data Dc to bit map data Dbmp.

Subsequently, in step S212, the pit art data editing partXX 41 compares the size of the bit map data Dbmp and the shape of the unrecorded area and automatically edits the resolution (dot density per unit area) and size of the bit map data Dbmp so that the pit art does not overflow from the unrecorded area. Then, the edited bit map data Dbmp is stored in the bit art data memory 37.

Subsequently, in step S214, the bit map data Dbmp stored in the pit art data memory 37 is supplied to the display unit 4 through the microcomputer MPU. A display indicating how the pit art is formed in the unrecorded area of the disk DSC is presented. That is, a preview is displayed.

Figure 8:
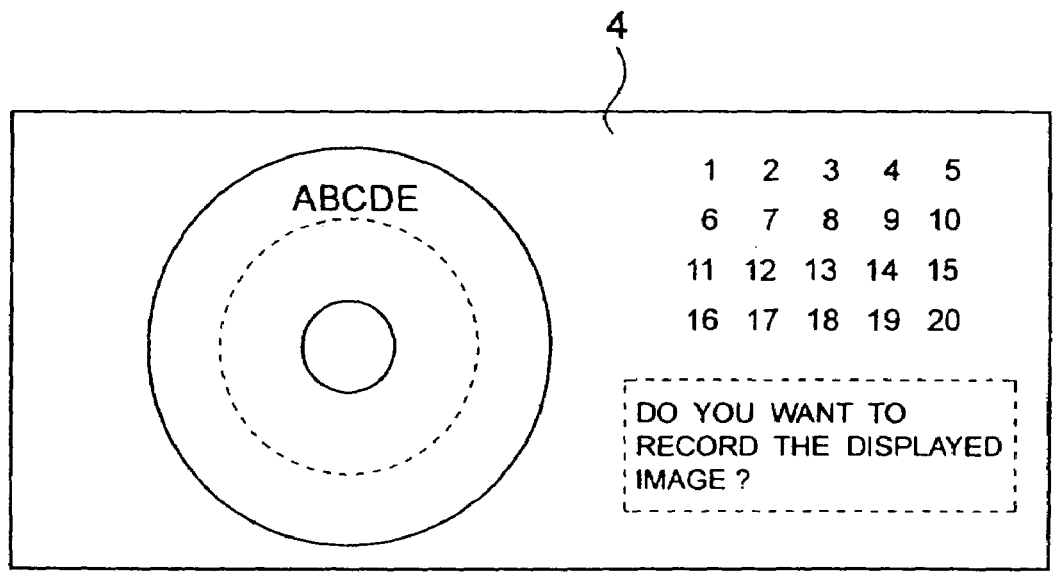
FIG. 8 is an explanatory view showing an example of a preview display in a display unit.

FIG. 8 shows an example of a preview display. For example, if the character information data D6 is an album title "ABCDE", the shapes of the disk DSC and the unrecorded area are displayed. Bit map data Dbmp of the edited "ABCDE" is further displayed in the display of the unrecorded area.

In addition, a message for prompting an instruction about whether pit art recording of this bit map data Dbmp can be started, for example, "DO YOU WANT TO RECORD THE DISPLAYED IMAGE?" or the like is displayed.

Thus, the user can view in advance the size, layout and the like of characters "ABCDE" to be recorded as a pit art.

Subsequently, when continuation of pit art recording is instructed by the function switch 9 in response to this preview display in step S216, the processing proceeds to step S218. On the other hand, if termination of pit art recording is instructed by the function switch 9, the processing proceeds to step S202 and pit art recording prohibition processing is performed to terminate a series of data recording processing. For example, if the user views the preview display and determines that the characters of "ABCDE" to be recorded as a pit art are too small, that the position of the pit art in the unrecorded area is not appropriate or the like, unnecessary pit art recording is not performed by instructing to terminate the pit art recording.

If the pit art becomes too small because the shape of the unrecorded area (particularly, width W of the unrecorded area) is small when the pit art data editing partXX 41 compares the shape of the unrecorded area and the size of the bit map data Dbmp, the processing may automatically proceeds to step S202 so that pit art recording is not performed.

Subsequently, in step S218, after the pickup 28 is moved from the start address ADRS of the unrecorded area to a position a prescribed number of tracks N1 away (in this embodiment, N1=1000 tracks) outward in the radius direction, a portion of the prescribed number of tracks N2 (in this embodiment N2=1000 tracks) outward in the radius direction from this moved position is irradiated with writing light having a prescribed power to form an annular pit art. Consequently, the annular unrecorded portion of N1 tracks and the annular pit art of N2 tracks are arranged as concentric circles outside the recorded area from the read-in area to the start address ADRS in which data is already recorded. Therefore, this annular pit art can be seen as a border of the recorded area and the pit art described later.

When the pit art data editing partXX 41 automatically edits the resolution (dot density per unit area) and the size of the bit map data Dbmp in step S212 as well, the bit map data Dbmp is automatically edited based on the annular unrecorded portion of N1 tracks and the shape of unrecorded area existent outside of the annular pit art portion of N2 tracks in the radius direction.

Subsequently, in step S220, the pickup 28 is positioned at an address located outside in the radius direction of the disk DSC of the portion where the annular pit art is formed. Further, in step S222, the first one dot of the bit map data Dbmp is read from the pit art data memory 37 and written in the unrecorded area of the disk DSC when supplied to the pickup 28 as pit art data Dp.

Subsequently, whether pit art recording is completed is judged in step S224. If the recording is not completed, the processing goes back to step S220 and the bit map data Dbmp of the next one dot is supplied to the pickup 28 as pit art data Dp and recorded at the next address of the unrecorded area (step S222).

Then, when pit art recording is completed, the display unit 4 displays a message to the effect that pit art recording is completed in step S226 and then pit art recording is terminated.

Figure 9:
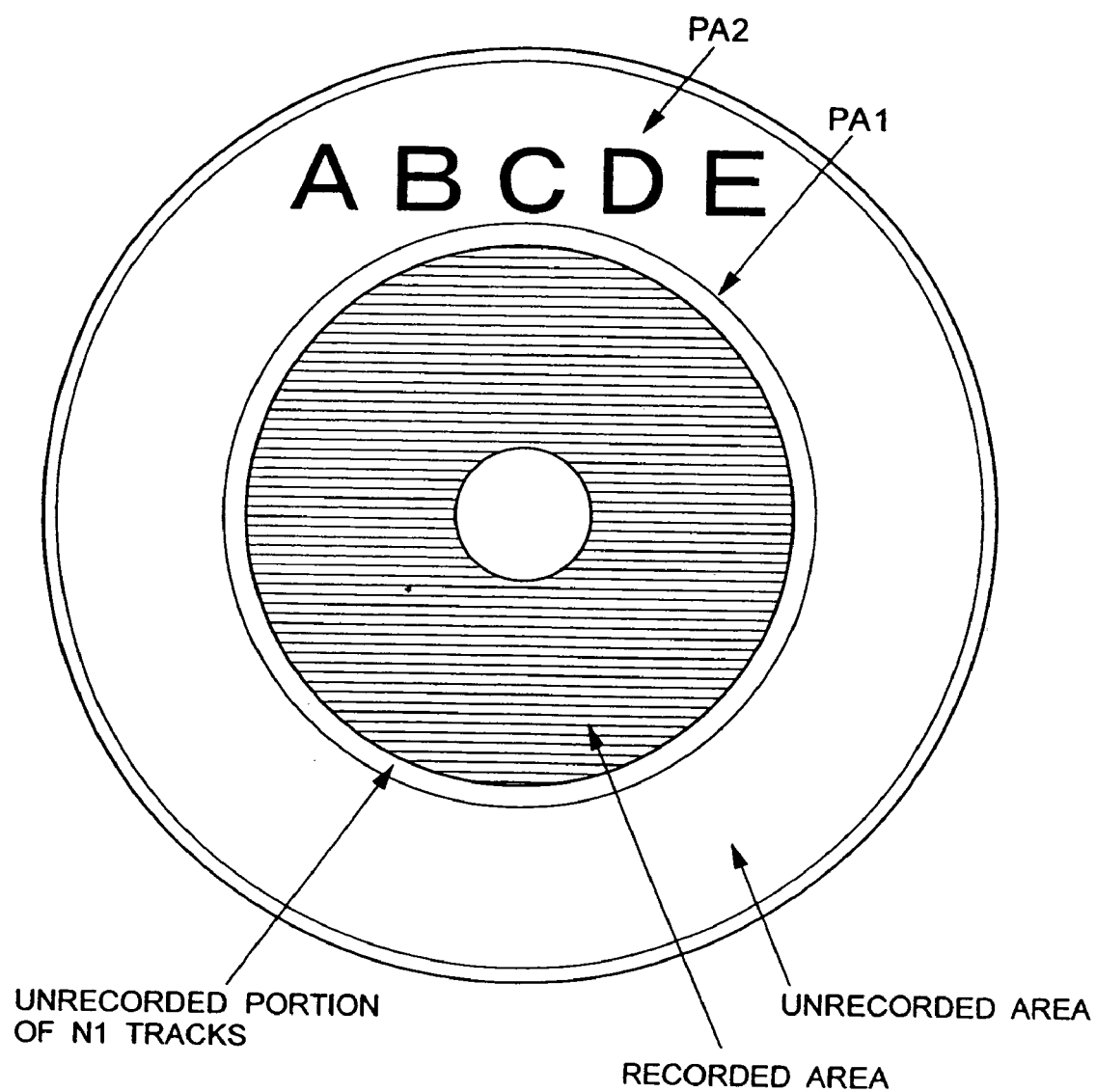
FIG. 9 is an explanatory view showing an example when a pit art is recorded.

When pit art recording is thus performed, as shown in FIG. 9, a pit art PA1 composed of annular pit strings indicating a border of the recorded area and the unrecorded area and a character pit art PA2 such as "ABCDE" or the like are formed.

Then, the annular pit art PA1 and the character portion of the pit art PA2 are recorded as a multiplicity of pits in the recording layer of the CD-R and pits are not formed in the background portion. Since the reflectance of the portion where pits are formed is different from that of the portion where pits are not formed, a pit art PA2 such as "ABCDE" is visible due to this difference in reflectance.

Thus, when a pit art is formed in the external data recording mode, the user can readily identify or manage disks only by viewing the pit art PA2.

When information is hand-written in a conventional technique, there are problems that labels become unclear or the appearance is deteriorated and the like. However, since the pit art is formed in the recording layer of the disk, clarity is maintained and there is not problem such as deterioration of the appearance or the like.

The recorded area and the unrecorded area can be distinguished only by viewing the annular pit art PA1. Therefore, the user can judge that the unrecorded area where the pit art PA2 is formed can be touched by hand, but the recorded area where data is recorded should not be touched.

When data is reproduced, data of the pit art is not reproduced by mistake by detecting the annular pit art PA1 and finding presence of the unrecorded area where a pit art is formed.

Since the recording layer of the CD-R is formed with organic dye, a pit art can be formed clearly when a pit art is recorded. In particular, when a pit art is recorded in a CD-R having a recording layer formed with cyanine or azo dye, a pit art with high contrast can be formed.

As described above, since a CD-R is loaded or unloaded in this digital audio system 1 with the recording layer side up and the label side down, the user can handle the CD-R while viewing the pit art. Therefore, the user can readily manage or identify disks according to the pit art and thus convenience of a pit art can be more effectively provided. However, a CD-R may be loaded/unloaded with the recording layer side down and the label side up and a pit art may be recorded from the recording layer side facing downward.

In this external data recording mode, since the character information data in the table of contents information supplied from the CD player is automatically recorded to the copy target disk as pit art data, a method of easily recording a pit art can be provided to the user.

Although the case where a CD player is connected as external equipment has been described, when an MD player is connected, character information data included in UTOC data can be recorded as pit art data. When a CS tuner or BS tuner is connected, character information received by the CS tuner or BS tuner can be recorded as pit art data.

In the external data recording mode described above, after finalization processing is performed in step S120, processing for pit art recording shown in FIG. 6 is performed. However, the processing for pit art recording may be started without finalization processing as a modification.

However, in this case, in the step S120, when writing of the data D1 is completed, table of contents information assigned to data D1 is recorded as temporary TOC in a program management area (PMA) inside the read-in area of the disk DSC. Then, processing for pit art recording shown in FIG. 6 is performed.

Furthermore, in processing for pit art editing and preview displaying in steps S206–S214, the start address ADRS of the unrecorded area is detected based on the temporary TOC information. The position of a track being relatively many tracks away from the start address ADRS outward in the radius direction is assumed as the first position where a pit art can be recorded. Pit art editing and preview displaying are carried out by assuming the unrecorded area further outward from the start position in the radius direction as an area where a pit art can be recorded.

Furthermore, when the annular pit art PA1 and pit art PA2 are recorded in steps S218–S224 as well, these annular pit art PA1 and pit art PA2 are recorded in the unrecorded area outside of a position being 10,000–30,000 tracks away from the start address ADRS outward in the radius direction.

According to this modification, the unrecorded area of N1 tracks shown in FIG. 9 is secured for 10,000–30,000 tracks and so-called partial disk can be created. Consequently, the user can additionally record data in the unrecorded area secured for 10,000–30,000 tracks. Therefore, a partial disk which is more convenient and can be easily managed or the like by the recorded pit art can be provided.

When the additionally recordable unrecorded area of 10,000–30,000 tracks is secured, the user may select the desired number of tracks in a range of this number of tracks or the user may specify the desired number of tracks without limitation of the number of tracks. Or, the user may specify the number of tracks as an amount converted to time to secure the specified unrecorded area as an additionally recordable area.

Operation in an internal data recording mode will be described below with reference to a flowchart in FIG. 10. In operation described here as a typical case, the user loads a finalized CD-R, that is, a CD-R in which TOC information is already recorded in the read-in area and data is recorded in the read-out area, in the digital audio system 1 and a pit art is recorded in this CD-R.

Figure 10:
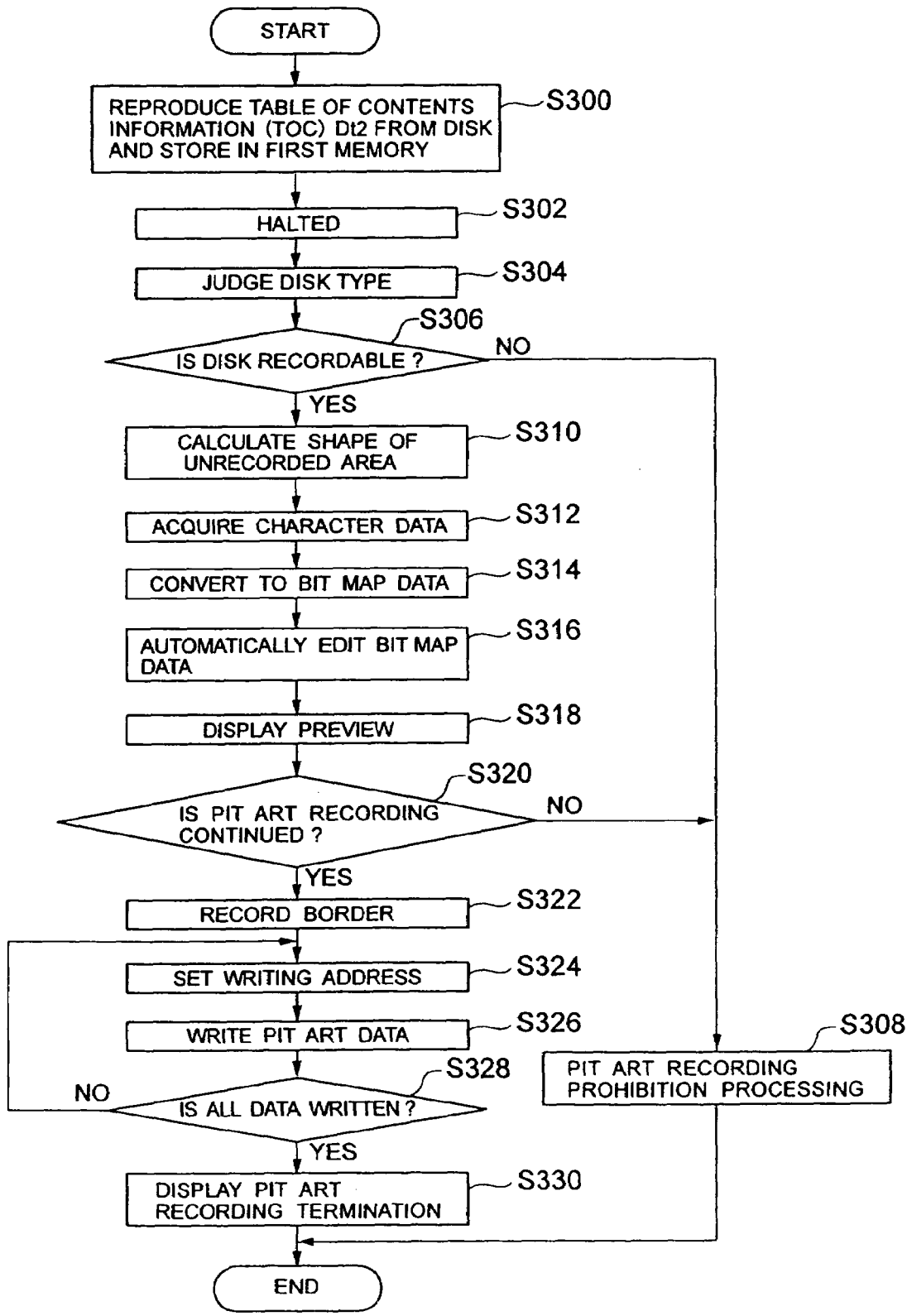
FIG. 10 is a flowchart for explaining operation in a second automatic mode in the digital audio system of this embodiment.

In FIG. 10, when the user loads a finalized CD-R, TOC data Dt2, is reproduced from the loaded disk DSC and stored in the first memory (not shown) in the system controller 21 (step S300) and the processing is halted (step S302).

In this halt state, when the user operates a prescribed operating switch among the function switches 9 to select the internal data recording mode, the processing proceeds to step S304. Based on the TOC data Dt2 in the first memory, the type of the disk is judged.

Subsequently, whether a recordable disk is loaded is judged (step S306). Here, if a disk exclusively used for reproduction such as a CD-ROM or the like is loaded, record prohibition processing such as displaying a message in the display unit 4 to the effect that data cannot be recorded is performed (step S308). Then, the processing is forcibly terminated. On the other hand, when the disk DSC is a CD-R, it is determined that a recordable disk is loaded and the processing proceeds to step S310.

In step S310, a first address ADRS of an unrecorded area remaining in the disk DSC is detected from the TOC data Dt2 in the first memory. Further, a terminal end address ADRE of the unrecorded area is detected based on the maximum read-out start position information (position information indicating the latest address among position information standardized as read-out recording start address) recorded as ATIP information in a wobbled portion of the read-in area. Then, these address data ADRS and ADRE are supplied to the pit art data editing partXX 41 shown in FIG. 4 together with data D7 for edit instruction.

Furthermore, the pit art data editing partXX 41 calculates the shape of the unrecorded area based on the address data ADRS and ADRE. That is, as shown in FIG. 7, the width W of the unrecorded area in the disk DSC radius direction is calculated and the shape of the unrecorded area in an annular shape matching the width W is obtained. In this step S310 as well as in step S206 in FIG. 6, the width W and shape of the unrecorded area N1 tracks outward in the radius direction from the start address ADRS of the unrecorded area is calculated.

Subsequently, in step S312, character information data D6 (data such as album titles, names of music pieces, artist names and the like) included in the TOC data Dt1 stored in the first memory is supplied to the character data decoding partXX 40 shown in FIG. 4.

Subsequently, in step S314, the character data decoding partXX 40 retrieves standard character data Dc corresponding to the character information data D6 and supplies the data to the pit art data editing partXX 41. The pit art data editing partXX 41 converts the standard character data Dc to bit map data Dbmp.

Subsequently, in step S316, the pit art data editing partXX 41 compares the size of the bit map data Dbmp and the shape of the unrecorded area and automatically edits the resolution (dot density per unit area) and size of the bit map data Dbmp so that the pit art does not overflow from the unrecorded area. Then, the edited bit map data Dbmp is stored in the pit art data memory 37.

Subsequently, in step S318, the bit map data Dbmp stored in the pit art data memory 37 is supplied to the display unit 4 through the microcomputer MPU. A preview display indicating how the pit art is formed in the unrecorded area of the write-once type disk DSC is presented.

For example, as in the case shown in FIG. 8, if the character information data D6 is an album title "ABCDE", the shapes of the disk DSC and the unrecorded area are displayed. Bit map data Dbmp of the edited "ABCDE" is further displayed in the display of the unrecorded area. Based on this bit map data Dbmp, a message for prompting an instruction about whether pit art recording can be started, for example, "DO YOU WANT TO RECORD THE DISPLAYED IMAGE?" or the like is displayed.

Consequently, the user can view in advance the size, layout and the like of characters "ABCDE" to be recorded as a pit art.

Subsequently, when continuation of pit art recording is instructed by the function switch 9 in response to this preview display in step S320, the processing proceeds to step S322. On the other hand, if an instruction not to perform pit art recording is given by the function switch 9, the processing proceeds to step S308 and pit art recording prohibition processing is performed to terminate a series of data recording processing.

In step S322, the pickup 28 is moved from the start address ADRS of the unrecorded area to a position being N1 tracks away. A portion of N2 tracks from this position is irradiated with writing light having a prescribed power. Consequently, an annular pit art PA1 indicating a border of the unrecorded area and the recorded area is formed.

Subsequently, in step S324, the pickup 28 is positioned at an address of the portion where the annular pit art is formed, the address being positioned outside in the radius direction of the disk DSC. Further, in step S326, the first one dot of the bit map data Dbmp is read from the pit art data memory 37 and written in the unrecorded area of the disk DSC when supplied to the pickup 28 as pit art data Dp.

Subsequently, in step S328, whether pit art recording is completed is judged. If the recording is not completed, the processing goes back to step S324 and the bit map data Dbmp of the next one dot is supplied to the pickup 28 as pit art data Dp and recorded at the next address of the unrecorded area (step S326).

Then, when writing of all bit map data Dbmp is completed, the display unit 4 displays a message to the effect that pit art recording is completed in step S330 and then pit art recording is terminated.

When pit art recording is thus performed, as shown in FIG. 9, an annular pit art PA1 indicating a border of the recorded area and the unrecorded area and a character pit art PA2 such as "ABCDE" or the like are formed. Since the reflectance of the portion where pits are formed is different from that of the portion where pits are not formed, the user can easily identify or manage disks only by viewing the pit arts PA1 and PA2.

According to this internal data recording mode, table of content information data already recorded in the CD-R can be automatically recorded as pit art data. Consequently, benefits such as utilizing a pit art as if data were handwritten and so forth can be provided to a user.

The case where a pit art is recorded in a finalized CD-R in the internal data recording mode has been described above. However, a pit art may be recorded in a partial disk.

In this case, a pit art can be recorded in a partial disk as well by processing temporary TOC information recorded in the PMA of the partial disk as the TOC information recorded in the finalized CD-R.

Operation in a manual mode will be described below with reference to a flowchart in FIG. 11. In operation described here as a typical case, the user loads a finalized CD-R in this digital audio system 1, then edits a pit art and records the pit art in the loaded CD-R.

Figure 11:
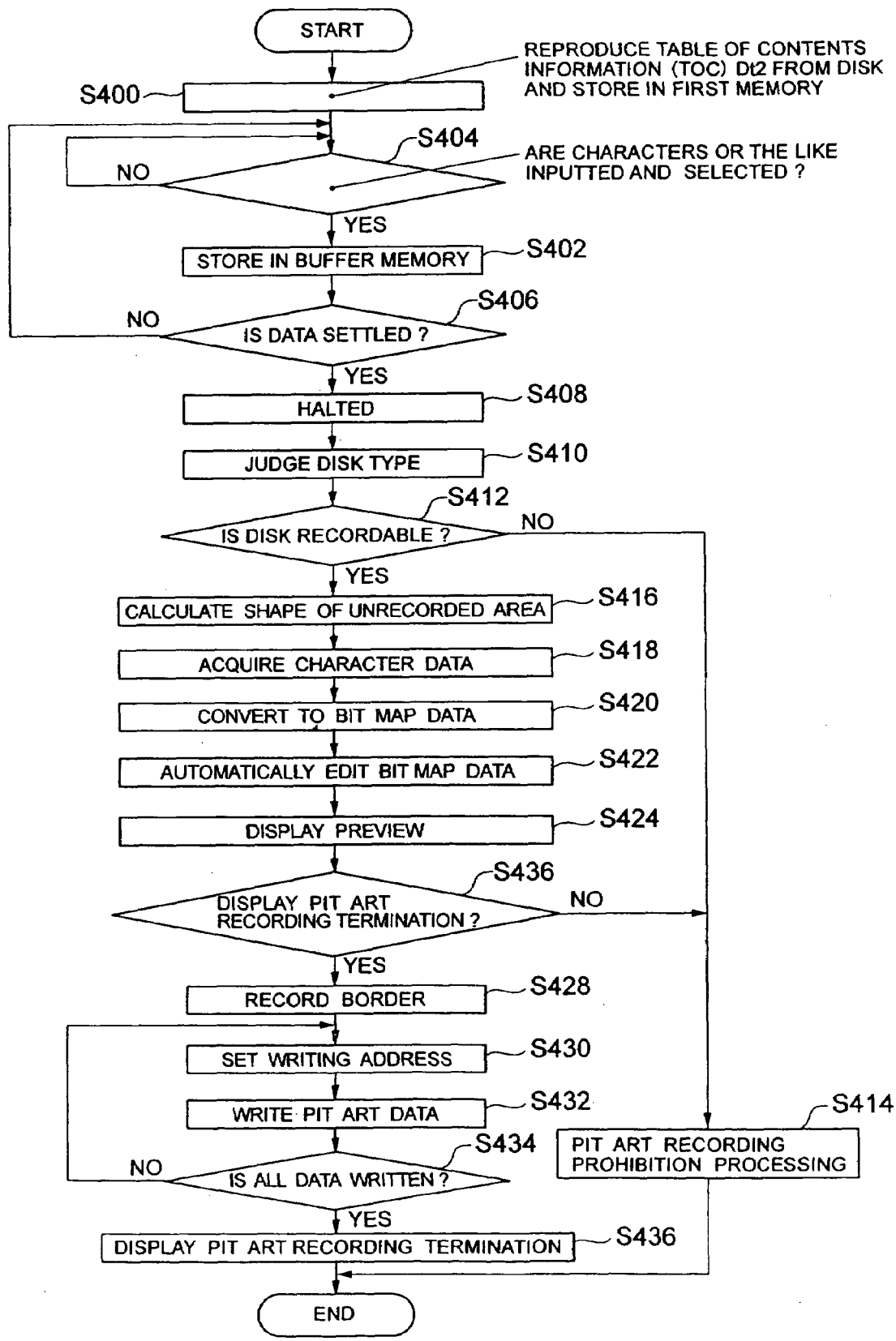
FIG. 11 is a flowchart for explaining operation in a manual mode in the digital audio system of this embodiment.

In FIG. 11, when the user loads the finalized CD-R, TOC data Dt2, which is table of contents information, is reproduced from the loaded disk DSC and stored in the first memory in the system controller 21 and the processing is halted (step S400).

In this halt state, when the user operates a prescribed operating switch among the function switches 9 to select the manual mode, the processing proceeds to steps S402–406.

In steps S402–406, desired characters, symbols, illustrations or the like are inputted by the rotary switch 11 called as a jog dial or the keyboard 22. Whether these characters or the like are selected is judged. If not yet, the processing remains in a standby state until the above input and select operation are carried out (step S402).

Here, if the above characters or the like are inputted, the inputted data such as characters or the like is stored temporarily in a prescribed buffer register and these characters or the like are blinked in the display unit 4. When select operation is performed, the data such as characters or the like in the buffer register is stored in a buffer memory and settled and the aforementioned blinking display is changed to a stationary display (display which does not blink) to indicate that the inputted characters or the like are settled (step S404).

Figure 12:
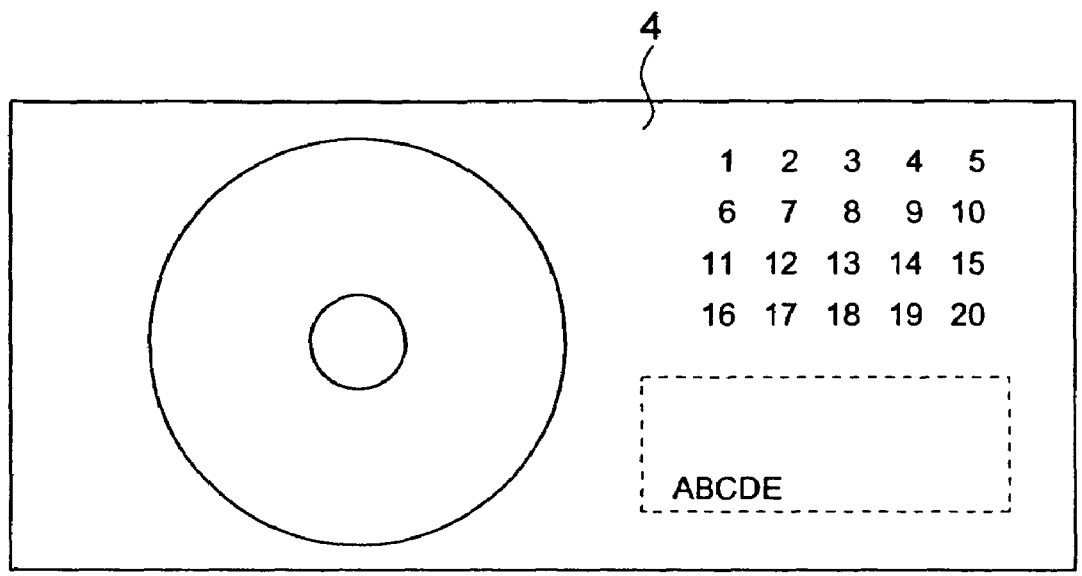
FIGS. 12 and 13 are explanatory views showing examples of a preview display presented in the display unit in the manual mode.

More specifically, for example, when the user appropriately rotates the rotary switch 11 to input a character string "ABCDE" and an operating switch for selection (hereinafter, referred to as enter key) is operated each time each character is inputted, that is, (A)_(enter)_(B)_(enter)_(C)_(enter)_(D)_(enter)_(E)_(enter) are pressed, the character string "ABCDE" can be specified and the character string is displayed in the inputted order as shown in FIG. 12.

When the keyboard 22 is operated, the character string "ABCDE" is inputted by using keys provided on the keyboard 22 and each time each character is inputted, the "return key" is pressed to specify the character string "ABCDE".

Thus, when the user inputs the desired character string and operates a prescribed operating switch among the function switches 9 to instruct final settlement of the character string as a pit art, the processing is halted (step S408) and then proceeds to step S410. When the user operates a keyboard 22 and the aforementioned "return key" provided on the keyboard 22 is operated again, the processing proceeds to step S408 and then to step S410.

In step S410, the type of the disk is judged based on the TOC data Dt2 in the first memory.

Subsequently, whether a recordable disk is loaded is judged (step S412). Here, if a disk exclusively used for reproduction such as a CD-ROM or the like is loaded, record prohibition processing such as displaying a message in the display unit 4 to the effect that data cannot be recorded is performed (step S414). Then, the manual mode is forcibly terminated. On the other hand, when the disk DSC is a write-once type disk, it is determined that a recordable disk is loaded and the processing proceeds to step S416.

In step S416, a first address ADRS of an unrecorded area remaining in the write-once disk DSC is detected from the TOC data Dt2 in the first memory. Further, a terminal end address ADRE of the unrecorded area is detected based on the maximum read-out start position information (position information indicating the latest address among position information standardized as read-out recording start address) recorded as ATIP information in a wobbled portion of the read-in area. Then, these address data ADRS and ADRE are supplied to the pit art data editing partXX 41 shown in FIG. 4 together with data D7 for editing instruction.

Furthermore, the pit art data editing partXX 41 calculates the shape of the unrecorded area based on the address data ADRS and ADRE. That is, as shown in FIG. 7, the width W of the unrecorded area in the radius direction of the disk DSC is calculated and the shape of the unrecorded area in an annular shape matching the width W is obtained.

In this step S416 as well as in step S206 in FIG. 6, the width W and shape of the unrecorded area N1 tracks outward in the radius direction from the start address ADRS of the unrecorded area is calculated.

Subsequently, in step S418, data D6 such as a character string or the like (data such as character string or the like selected by the user) stored in the buffer memory is supplied to a character data decoding partXX 40 shown in FIG. 4.

Subsequently, in step S420, the character data decoding partXX 40 retrieves standard character data Dc corresponding to the data D6 and supplies the data to the pit art data editing partXX 41. The pit art data editing partXX 41 converts the standard character data Dc to bit map data Dbmp.

Subsequently, in step S422, the pit art data editing partXX 41 compares the size of the bit map data Dbmp and the shape of the unrecorded area and edits the resolution (dot density per unit area) and size of the bit map data Dbmp so that the pit art does not overflow from the unrecorded area. Then, the edited bit map data Dbmp is stored in the pit art data memory 37.

Subsequently, in step S424, the bit map data Dbmp stored in the pit art data memory 37 is supplied to the display unit 4 through the microcomputer MPU. A preview display indicating how the pit art is formed in the unrecorded area of the write-once type disk DSC is presented.

Figure 13:
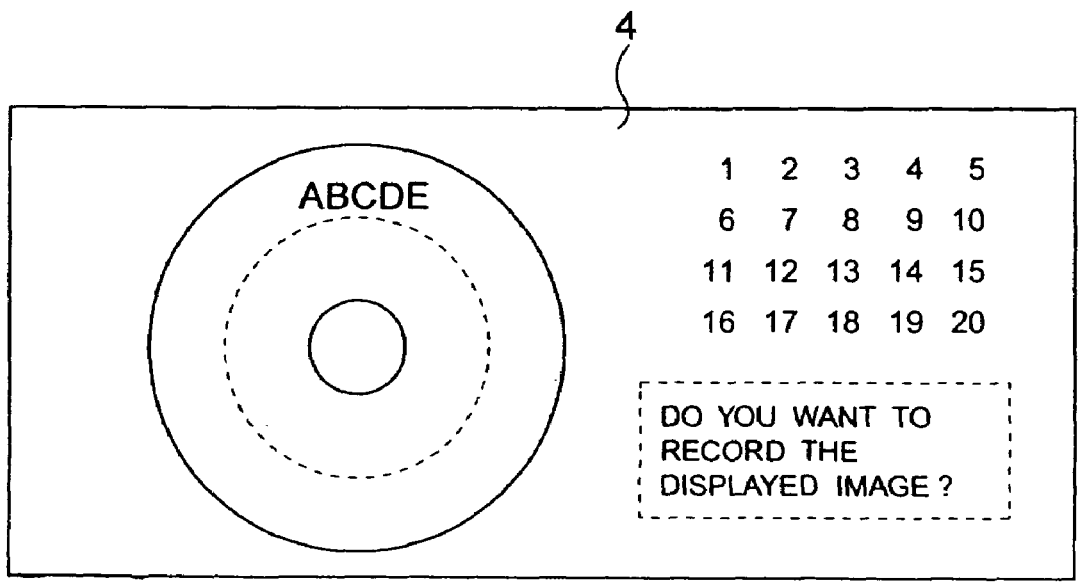

For example, as shown in FIG. 13, if the data D6 is a character string "ABCDE", the shapes of the disk DSC and the unrecorded area are displayed. Bit map data Dbmp of the edited "ABCDE" is further displayed in the display of the unrecorded area. Based on this bit map data Dbmp, a message for prompting an instruction about whether pit art recording can be started, for example, "DO YOU WANT TO RECORD THE DISPLAYED IMAGE?" or the like is displayed.

Consequently, the user can view in advance the size, layout and the like of characters "ABCDE" to be recorded as a pit art.

Subsequently, when continuation of pit art recording is instructed by the function switch 9 or the keyboard 22 in response to this preview display in step S426, the processing proceeds to step S428. On the other hand, if an instruction not to perform pit art recording is given by the function switch 9 or the keyboard 22, the processing proceeds step S414 and pit art recording prohibition processing is performed to terminate a series of data recording processing.

Subsequently, in step S428, the pickup 28 is moved from the start address ADRS of the unrecorded area to a position being N1 tracks away outward in the radius direction. Then, a portion of N2 tracks is irradiated with writing light having a prescribed power. Consequently, an annular pit art PA1 indicating a border of the unrecorded area and the recorded area is formed.

Subsequently, in step S430, the pickup 28 is positioned at an address of the portion where the annular pit art PA1 is formed, the address being positioned outside in the radius direction of the disk DSC. Further, in step S432, the first one dot of the bit map data Dbmp is read from the pit art data memory 36 and written in the unrecorded area of the disk DSC when supplied to the pickup 28 as pit art data Dp.

Subsequently, in step S434, whether all the bit map data Dbmp is written in the unrecorded area is judged. If not, the processing goes back to step S430 and the bit map data Dbmp of the next one dot is supplied to the pickup 28 as pit art data Dp and recorded at the next address of the unrecorded area (step S432).

Then, when writing of all bit map data Dbmp is completed, the display unit 4 displays a message to the effect that pit art recording is completed in step S436 and then pit art recording is terminated.

When pit art recording is thus performed, as shown in FIG. 9, an annular pit art PA1 indicating a border of the recorded area and the unrecorded area and a character pit art PA2 such as "ABCDE" or the like are formed. Since the reflectance of the portion where pits are formed is different from that of the portion where pits are not formed, the user can easily identify or manage disks only by viewing the pit arts PA1 and PA2.

According to this manual mode, the user can record a desired title or the like as pit art data. Therefore, benefits such as utilizing a pit art as if data were hand-written and so forth can be provided to a user.

Thus, since a visible pit art is recorded in a recordable disk according to the digital audio system of this embodiment, the user can manage or identify a plurality of disks by viewing the patterns.

The case where a pit art edited by the user is recorded in a finalized CD-R in the manual mode has been described above. However, a pit art edited by the user can be recorded in a partial disk as well. In this case, the pit art can be recorded in a partial disk by processing temporary TOC information recorded in the PMA area of the partial disk as the TOC information recorded in the finalized CD-R.

In this embodiment described above, the case where a pit art is recorded in a CD-R has been described. However, a pit art can be recorded in optical recording media in which data can be written, such as CD-RW, DVD-R, DVD-RW and the like as well.

According to the digital audio system of this embodiment, when a disk on both sides of which data can be recorded such as a DVD-R or the like is used, one recordable side can be exclusively used for recording a pit art and the other side can be used as a side for recording usual data.

When a disk both sides of which are recordable such as a DVD-R or the like is used, part of one recordable side can be used as an area for recording a pit art and part of the other recordable side can also be used as an area for recording a pit art so that pit arts can be formed on both sides and usual data can also be recorded on both sides.

As shown in FIG. 8, the case where a pit art such as a character string or the like is arranged in a line has been described. However, a character string or the like can be arranged in a circular arc to form a pit art matching the shape of the circular disk. A editing function capable of editing pit map data in a various manner may be provided by assuming the whole unrecorded area the same as the conventional label side.

In the above embodiments, the case where a pit art is recorded by writing light used in normal data recording has been described. However, since the spot diameter of the writing light irradiated on the recording layer of a disk is small, a problem is expected that a long time is required to form a visible pit art. Therefore, when a pit art is recorded, an object lens provided on the pickup 28 may be adjusted to irradiate with writing light having a larger spot diameter. Alternatively, a pickup exclusively used for pit art recording by irradiating with writing light having a large spot diameter may be provided.

In the above embodiments, a pit art is automatically recorded in the external data recording mode and the internal data recording mode. However, the user may edit pit art data by manual operation in these external data recording mode and internal data recording mode as well.

In steps S206 in FIG. 6, S310 in FIG. 10 and S416 in FIG. 11, the shape of the unrecorded area is detected based on the TOC information or temporary TOC information and ATIP information. As another modification, the shape of the unrecorded area may be detected by moving the pickup in the radius direction of the disk DSC and based on the difference in the quantity of returning light (reflected light) from the recorded area and unrecorded area obtained upon this movement.

The shape of the unrecorded area may be detected or judged not based on the difference in the reflected light quantity from the recorded area and the unrecorded area, but by comparing the reflected light quantity from the recorded area or that from the unrecorded area with a prescribed threshold value or the like.

In this embodiment, both the writing for forming an image pattern (pit art) and normal information writing are performed by one pickup 28 as writing means. However, a pickup for forming an image pattern (pit art) as well as a pickup for normal information writing may be provided.

In this embodiment, the case where so-called bit map data is generated and a pit art is recorded in the recording layer of an optical recording medium by light beam modulated based on the bit map data has been described. However, a pit art may be recorded not only based on the so-called bit map data but also based on data in other data formats.

A pit art is recorded not only depending on presence of pits, but the size of pits may be adjusted or the interval between pits may be adjusted to record a pit art so that a pit art visually having a plurality of gradations can be recorded. Consequently, a pit art which can express shades, that is, a pit art having an expressive ability can be formed.

The case where an annular pit art PA1 is formed between an area where normal information is recorded (recorded area) and an area where a pit art is to be recorded (unrecorded area) has been described. However, the present invention is not limited to this, but the pit art PA1 does not have to be recorded. The user may select whether this annular pit art PA1 is recorded.

In the above embodiments, a digital audio system constituted by hardware has been described. However, the present invention is not limited to this. The pit art recording function equivalent to this digital audio system may be achieved by a computer program.

For example, a recordable player (for example, a recordable CD player, DVD player or the like) which can record and reproduce data by using a recordable optical recording medium is mounted on a personal computer or the like. A computer program having the aforementioned pit art recording function is installed in the personal computer or the like and the computer program is executed by the personal computer so that a pit art is formed on an optical recording medium loaded in the recordable player.

According to this constitution, not only the users of the digital audio system, but convenience of pit art recording can be provided to many other users.

When a computer program having the pit art recording function is installed in a personal computer or the like, an optical recording medium in which the computer program is recorded may be provided and installed by using a CD player or DVD player mounted on the personal computer or the like. Alternatively, the personal computer or the like may be connected to a network such as the Internet or the like (including connection by telephone line, cable such as LAN or the like or radio) and the computer program is transmitted (downloaded) via the network so as to be set up in the personal computer or the like.

As described above, according to the information recording system and information recording method of the present invention, a recording layer formed in an optical recording medium is irradiated with light and changes in optical characteristics of the portion irradiated with light and the portion not irradiated with light in the recording layer are generated to form a visible image pattern. Therefore, a plurality of optical recording media can be managed or identified by viewing the formed image pattern.

What is claimed is:

1. An information writing apparatus for writing information on a write-once disk or a rewritable disk, comprising:
    a driver for driving said disk; and
    a writing component for writing a visible image pattern and writing data other than said visible image pattern by irradiation of a light beam onto said disk to form pits on said disk, wherein when writing said visible image pattern said writing component performs writing with a light beam having a spot diameter larger than that of a light beam used for writing the data other than said visible image pattern, so that said visible image pattern is formed with the light beam having the larger spot diameter in a time shorter than a time that would be reciuired with the light beam used for writing the data other than said visible image pattern.

2. An information writing apparatus as claimed in claim 1, wherein said writing component changes the spot diameter of said light beam by adjusting an objective lens.

3. An information writing apparatus as claimed in claim 2, wherein said writing component includes a single pickup, and said single pickup is commonly used for writing said visible image pattern and for writing said data other than said visible image pattern.

4. An information writing apparatus as claimed in claim 3, wherein said writing component has a semiconductor laser source, and said semiconductor laser source projects a reading light beam for reading said data other than said visible image pattern onto said disk, and projects a writing light beam for writing said visible image pattern and said data other than said visible image pattern onto said disk.

5. An information writing apparatus as claimed in claim 2, wherein said writing component has a semiconductor laser source, and said semiconductor laser source projects a reading light beam for reading said data other than said visible image pattern onto said disk, and projects a writing light beam for writing said visible image pattern and said data other than said visible image pattern onto said disk.

6. An information writing apparatus as claimed in claim 1, wherein said writing component includes a single pickup, and said single pickup is commonly used for writing said visible image pattern and for writing said data other than said visible image pattern.

7. An information writing apparatus as claimed in claim 6, wherein said writing component has a semiconductor laser source, and said semiconductor laser source projects a reading light beam for reading said data other than said visible image pattern onto said disk, and projects a writing light beam for writing said visible image pattern and said data other than said visible image pattern onto said disk.

8. An information writing apparatus as claimed in claim 1, wherein said writing component includes a pickup for writing said visible image pattern and a pickup for writing said data other than said visible image pattern.

9. An information writing apparatus as claimed in claim 1, wherein said data other than said visible image pattern is data of music or images.

10. An information writing apparatus as claimed in claim 1, wherein said writing component has a semiconductor laser source, and said semiconductor laser source projects a reading light beam for reading said data other than said visible image pattern onto said disk, and projects a writing light beam for writing said visible image pattern and said data other than said visible image pattern onto said disk.

11. An information writing apparatus as claimed in claim 1, wherein said visible image pattern is written on one surface of said disk, and said data other than said visible image pattern is recorded on the other surface of said disk.

12. An information writing apparatus for writing information on a write-once disk or a rewritable disk, comprising:
    a driver for driving said disk; and
    a writing component for writing a visible image pattern and writing data other than said visible image pattern by irradiation of a light beam onto said disk, wherein when writing said visible image pattern said writing component performs writing with a light beam having a spot diameter larger than that of a light beam used for writing the data other than said visible image pattern, so that said visible image pattern is formed with the light beam having the larger spot diameter in a time shorter than a time that would be reciuired with the light beam used for writing the data other than said visible image pattern.

13. An information writing apparatus as claimed in claim 12, wherein said writing component changes the spot diameter of said light beam by adjusting an objective lens.

14. An information writing apparatus as claimed in claim 13, wherein said writing component includes a single pickup, and said single pickup is commonly used for writing said visible image pattern and for writing said data other than said visible image pattern.

15. An information writing apparatus as claimed in claim 14, wherein said writing component has a semiconductor laser source, and said semiconductor laser source projects a reading light beam for reading said data other than said visible image pattern onto said disk, and projects a writing light beam for writing said visible image pattern onto said disk.

16. An information writing apparatus as claimed in claim 12, wherein said writing component includes a single pickup, and said single pickup is commonly used for writing said visible image pattern and for writing said data other than said visible image pattern.

17. An information writing apparatus as claimed in claim 12, wherein said writing component has a semiconductor laser source, and said semiconductor laser source projects a reading light beam for reading said data other than said visible image pattern onto said disk, and projects a writing light beam for writing said visible image pattern onto said disk.

18. An information writing apparatus as claimed in claim 12, wherein said visible image pattern is formed by using a difference between reflectances.

19. An information writing apparatus as claimed in claim 12, wherein said writing component forms said visible image pattern by creating portions of said disk having different reflectances by irradiation of light onto said disk.

20. An information writing method for writing information on a write-once disk or a rewritable disk, comprising:
a writing step for writing a visible image pattern and writing data other than said visible image pattern by irradiation of a light beam onto said disk, wherein when writing said visible image pattern a light beam is used, said light beam having a spot diameter larger than that of a light beam used for writing the data other than said visible image pattern, so that said visible image pattern is formed with the light beam having the larger spot diameter in a time shorter than a time that would be required with the light beam used for writing the data other than said visible image pattern.

* * * * *